United States Patent
Foltyn et al.

(10) Patent No.: US 7,457,601 B2
(45) Date of Patent: Nov. 25, 2008

(54) PRECISELY TIMED EXECUTION OF A MEASUREMENT OR CONTROL ACTION AND SYNCHRONIZATION OF SEVERAL SUCH ACTIONS

(75) Inventors: Roman Foltyn, Rückersdorf (DE); Rupert Maier, Eggolsheim (DE); Ralf Sykosch, Weilersbach (DE)

(73) Assignee: Siemens Aktiengesellschaft, München (DE)

( * ) Notice: Subject to any disclaimer, the term of this patent is extended or adjusted under 35 U.S.C. 154(b) by 57 days.

(21) Appl. No.: 10/595,486

(22) PCT Filed: Oct. 15, 2004

(86) PCT No.: PCT/EP2004/011649
§ 371 (c)(1),
(2), (4) Date: Nov. 21, 2006

(87) PCT Pub. No.: WO2005/043193
PCT Pub. Date: May 12, 2005

(65) Prior Publication Data
US 2007/0093226 A1  Apr. 26, 2007

(30) Foreign Application Priority Data
Oct. 21, 2003  (DE) ............... 103 49 476

(51) Int. Cl.
*H04B 7/00* (2006.01)
(52) U.S. Cl. .................. 455/265; 455/502
(58) Field of Classification Search ........... 455/265
See application file for complete search history.

(56) References Cited

U.S. PATENT DOCUMENTS

| 3,921,386 | A | * | 11/1975 | Keller ................ 368/161 |
| 3,927,269 | A | * | 12/1975 | Yoshino et al. ........ 348/24 |
| 4,290,131 | A | * | 9/1981 | Kume et al. ........... 368/71 |
| 4,303,983 | A | * | 12/1981 | Chaborski ............ 702/176 |
| 4,346,470 | A | * | 8/1982 | Alvarez et al. ........ 370/324 |

(Continued)

FOREIGN PATENT DOCUMENTS

DE  693 07 956  5/1997

(Continued)

*Primary Examiner*—Matthew Anderson
*Assistant Examiner*—Hai V Nguyen
(74) *Attorney, Agent, or Firm*—Henry M. Feiereisen; Ursala B. Day

(57) ABSTRACT

The invention relates to a method for a particularly precise execution of a measurement or control action and to a corresponding controller (9). A temporally periodic synchronization signal (S, S') generated by a receiver (9) based on a timing reference signal (Z) is divided by a switching frequency (F) generated by a timing generator (14) into a plurality of switching intervals ($I_n$). A switching command ($C_n$), which triggers a corresponding switching process of the action, is associated with each switching interval ($I_n$). Several measurement and control actions can be accurately synchronized by performing each action with the aforedescribed method using a common timing reference signal (Z).

8 Claims, 2 Drawing Sheets

FIG 2

U.S. PATENT DOCUMENTS

| | | | |
|---|---|---|---|
| 4,389,614 A * | 6/1983 | Staiger | 327/141 |
| 4,574,307 A * | 3/1986 | Nillesen | 348/542 |
| 4,794,643 A * | 12/1988 | Saeki et al. | 380/226 |
| 4,809,005 A * | 2/1989 | Counselman, III | 342/352 |
| 4,912,645 A * | 3/1990 | Kakihara et al. | 701/208 |
| 5,043,966 A * | 8/1991 | Zwaans | 369/47.36 |
| 5,113,257 A * | 5/1992 | Heerkens | 348/536 |
| 5,440,313 A | 8/1995 | Osterdock et al. | |
| 5,548,562 A | 8/1996 | Helgerud et al. | |
| 5,561,701 A * | 10/1996 | Ichikawa | 340/7.26 |
| 5,572,157 A * | 11/1996 | Takashi et al. | 327/156 |
| 5,629,626 A | 5/1997 | Russell et al. | |
| 5,650,981 A | 7/1997 | Jacobsen et al. | |
| 5,781,539 A * | 7/1998 | Tanaka | 370/312 |
| 5,937,357 A * | 8/1999 | Tanaka | 455/503 |
| 5,978,313 A | 11/1999 | Longaker | |
| 6,157,217 A * | 12/2000 | Zittlau et al. | 326/93 |
| 6,191,587 B1 | 2/2001 | Fox | |
| 6,204,694 B1 * | 3/2001 | Sunter et al. | 326/93 |
| 6,219,396 B1 * | 4/2001 | Owada | 375/372 |
| 6,369,574 B1 * | 4/2002 | Ederlov et al. | 324/339 |
| 6,512,616 B1 * | 1/2003 | Nishihara | 398/54 |
| 6,563,893 B2 * | 5/2003 | Smith et al. | 375/354 |
| 6,597,464 B2 * | 7/2003 | Bucher et al. | 356/638 |
| 6,618,035 B1 * | 9/2003 | Reza | 345/158 |
| 7,080,160 B2 * | 7/2006 | Cognet et al. | 709/248 |
| 7,106,246 B1 * | 9/2006 | Lindell | 342/51 |
| 7,218,696 B2 * | 5/2007 | Smith et al. | 375/356 |
| 2007/0195559 A1 * | 8/2007 | Gong | 363/21.01 |
| 2008/0008285 A1 * | 1/2008 | Smith et al. | 375/376 |

FOREIGN PATENT DOCUMENTS

| | | |
|---|---|---|
| DE | 196 13 734 | 8/1997 |
| DE | 198 47 665 | 5/2000 |
| DE | 198 41 262 | 12/2000 |
| JP | 2002148372 | 5/2002 |
| WO | WO-03/012480 | 2/2003 |

* cited by examiner

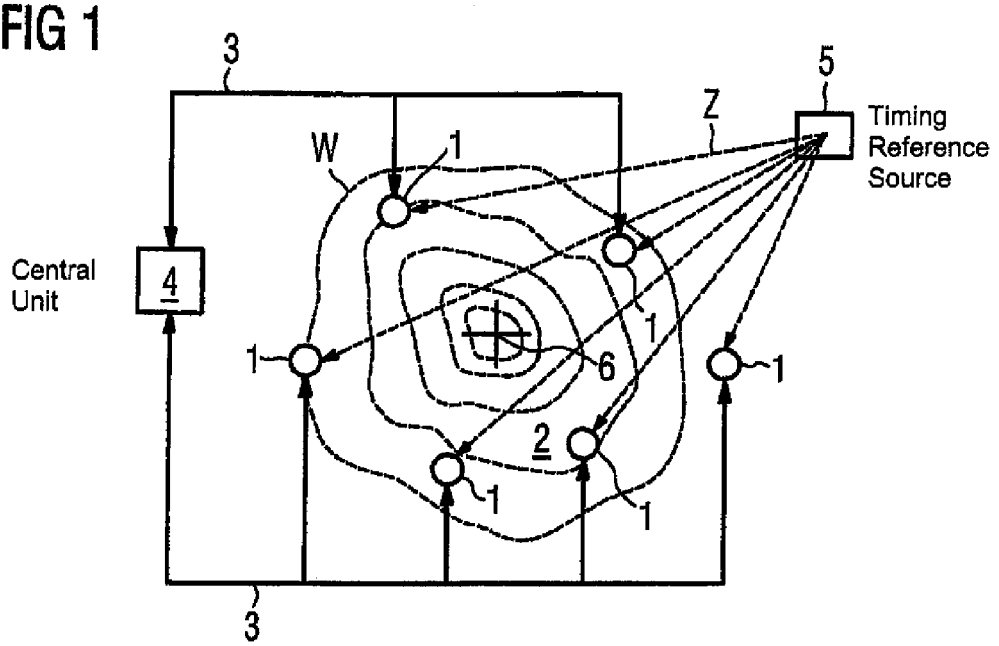
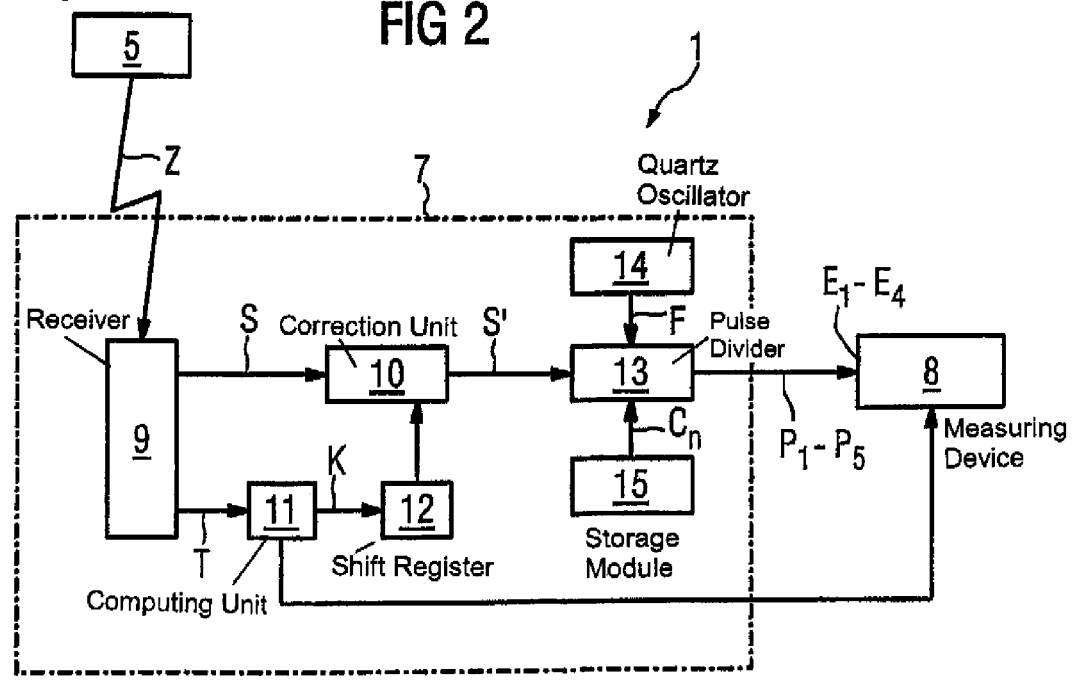

PRECISELY TIMED EXECUTION OF A MEASUREMENT OR CONTROL ACTION AND SYNCHRONIZATION OF SEVERAL SUCH ACTIONS

BACKGROUND OF THE INVENTION

The invention relates to a method of executing a measurement or control action and to a controller for carrying out the method. The invention also relates to a method for synchronizing several measurement and/or control actions.

The term measurement action is to be understood as a process where data are acquired with a measuring device, as well as stored or transmitted onward. The term control action is to be understood more generally as a process, by which a technical device is caused to perform any action, e.g., a movement, an electrical switching process, etc.

Such measurement or control action includes typically a sequence of individual switching processes, for example switching an operating voltage on, activating or deactivating a measuring channel, reading from or writing to a memory register, causing a data transfer, and the like.

A device which initiates or causes a measurement or control action of a technical device (in particular a measuring device) is referred to as controller.

Two actions are referred to as being synchronous if the sequence of operations of both actions is determined by the same time scale. However, in the context of the above definition, two synchronous actions need not necessarily be executed simultaneously. It is only important that a defined and determinable time correlation exists between each instant of the first action and each instant of the second action.

It is often necessary in practical applications to perform an action at a certain, precisely determined time or to at least know the exact time when an action is performed. This requirement applies in particular if the timed operation of several devices, in particular widely spaced devices, is coordinated within narrow times. Seismographic measurement methods are one example of such system.

In such method, the propagation of a shock or pressure wave in the ground is typically recorded by a number of spatially distributed seismic sensors. The location of a seismic source can be localized (e.g., earthquake detection) by comparing the seismic pattern recorded by the different sensors, or conclusions can be drawn about the structure of the ground by producing an artificial seismic event (seismographic ground measurements). The significance of the results from such investigation depends considerably on the temporal precision with which the seismic patterns from different sensors can be correlated. The measurement actions executed by different sensors must therefore be precisely synchronized.

Similar requirements for synchronizing measurement actions also apply to acoustic measurement methods (sonar, etc.) and to measurements of the oscillation characteristic of a mechanical system.

Typically, a measurement or control action is "triggered" by a clock, i.e., initiated at a certain instant. If different actions are triggered by independent clocks, then these actions are synchronous only to a limited extent due to the time differences caused by the inaccuracy of the clocks. The synchronism can be improved by aligning their clocks, for example, by Global Positioning Satellite (GPS) signals or radio timing signals.

A timing inaccuracy and an accompanying loss in synchronism may also result from the fact that a measurement or control action is typically not a process performed at an exact instant, but a process that occurs over a certain time interval due to the potentially large number of required switching processes. The actual measurement or control is therefore not executed at the exact time when a trigger command is outputted, but at a later time which has a comparatively poor temporal correlation with the trigger time.

SUMMARY OF THE INVENTION

It is therefore an object of the invention to provide a method for executing a measurement or control action with a particularly high timing precision in a simple manner. It is another object of the invention to provide a suitable controller for carrying out this method. It is a further object of the invention to provide a method for a particularly precise synchronization of two measurement and control actions.

According to one aspect of the present invention, a receiver is provided which receives a timing reference signal and generates a temporally periodic synchronization signal based on the timing reference signal. The timing reference signal can be any signal from which a time scale can be derived. The timing reference signal can have an artificial origin, in particular a GPS signal or a radio timing signal. However, a natural signal can also be used as a timing reference signal. For example, if the method of the invention were employed in space, the regular emission of pulsed radio signals from a pulsar could be used as a timing reference signal. The controller also includes a timing generator for generating a switching frequency.

The synchronization signal and the switching frequency are combined in a pulse divider which divides the period of the synchronization signal into a number of switching intervals. These switching intervals are used to clock a sequence control for the measurement or control action. In other words, a stored sequence of switching commands is processed in each interval, and a switching command is associated with each switching interval. The switching command is outputted to the device executing the action and thereby triggers a corresponding switching process of the action at the instant of the switching interval. The switching command can also be a blank instruction which does not trigger an explicit switching operation, but instead maintains the status quo for the duration of the associated switching interval.

The temporal resolution can be particularly high if the synchronization signal derived from an external timing reference is first divided into switching intervals and then used directly for the sequence control of the measurement or control action. The method and the associated controller advantageously associate an exact instant, commensurate with the accuracy of the timing reference, with each switching process of the action through the associated switching interval. The timing of a measurement or control and the entire sequential operation can then be determined with a very high precision.

Preferably, the receiver is a GPS receiver adapted to receive an available GPS signal worldwide. Such receivers are commercially available in many configurations. Advantageously, the synchronization signal is here the PPS (pulse-per-second) signal received by a standard GPS receiver with an inherent precision that can reach approximately ±60 ns.

The precise timing of the synchronization signal can be improved by continuously correcting the signal with a correction value. Such correction value typically includes information about the instantaneous timing error of the synchronization signal. This error is mainly caused by the finite propagation time of the timing reference signal or of the synchronization signal (due to the finite length of the propagation path, etc.), and also by deflection, reflection or echo effects.

A GPS receiver frequently outputs suitable standard correction information from which such correction value (PFST value) can be derived. The PPS signal and the PFST value are described in the NMEA (National Marine Electronics Association) protocol standard. The NMEA protocol is used by many commercially available GPS receivers for data output. The accuracy of the PPS signal can be increased to approximately ±10 ps by correcting the PPS signal with the PFST value.

An exemplary advantageous timing generator with a suitable timing-precision ratio is, for example, a quartz crystal oscillator, in particular a crystal oscillator with a timing accuracy $\Delta t/t \leqq 10$ psec/sec relative to the switching frequency.

In order to be able to use the controller and the method performed by the controller for various different measurement and control actions, the sequence of switching commands stored in the controller is advantageously defined by a stored program control which can be adapted to the respective requirements.

The object is solved by the invention with respect to a method for synchronizing several measurement and/or control actions by the features of claim 5.

Accordingly, each of the actions to be synchronized is performed by the aforedescribed method. The actions can then be synchronized by executing each action based on a common timing reference signal. For example, if several measurements are to be triggered at different locations by the method of the invention or by the associated controller, then these measurements are automatically synchronized if all receivers receive their timing reference from the GPS signal.

BRIEF DESCRIPTION OF THE DRAWING

An exemplary embodiment of the invention will now be described in detail with reference to the drawings. It is shown in:

FIG. 1 a schematic diagram of a seismographic measurement system with several measurement stations, FIG. 2 a schematic diagram of a measurement station with a controller and a measuring device according to FIG. 1, and FIG. 3 a simplified functional diagram of the controller of FIG. 2.

DETAILED DESCRIPTION OF PREFERRED EMBODIMENTS

Figure 3:
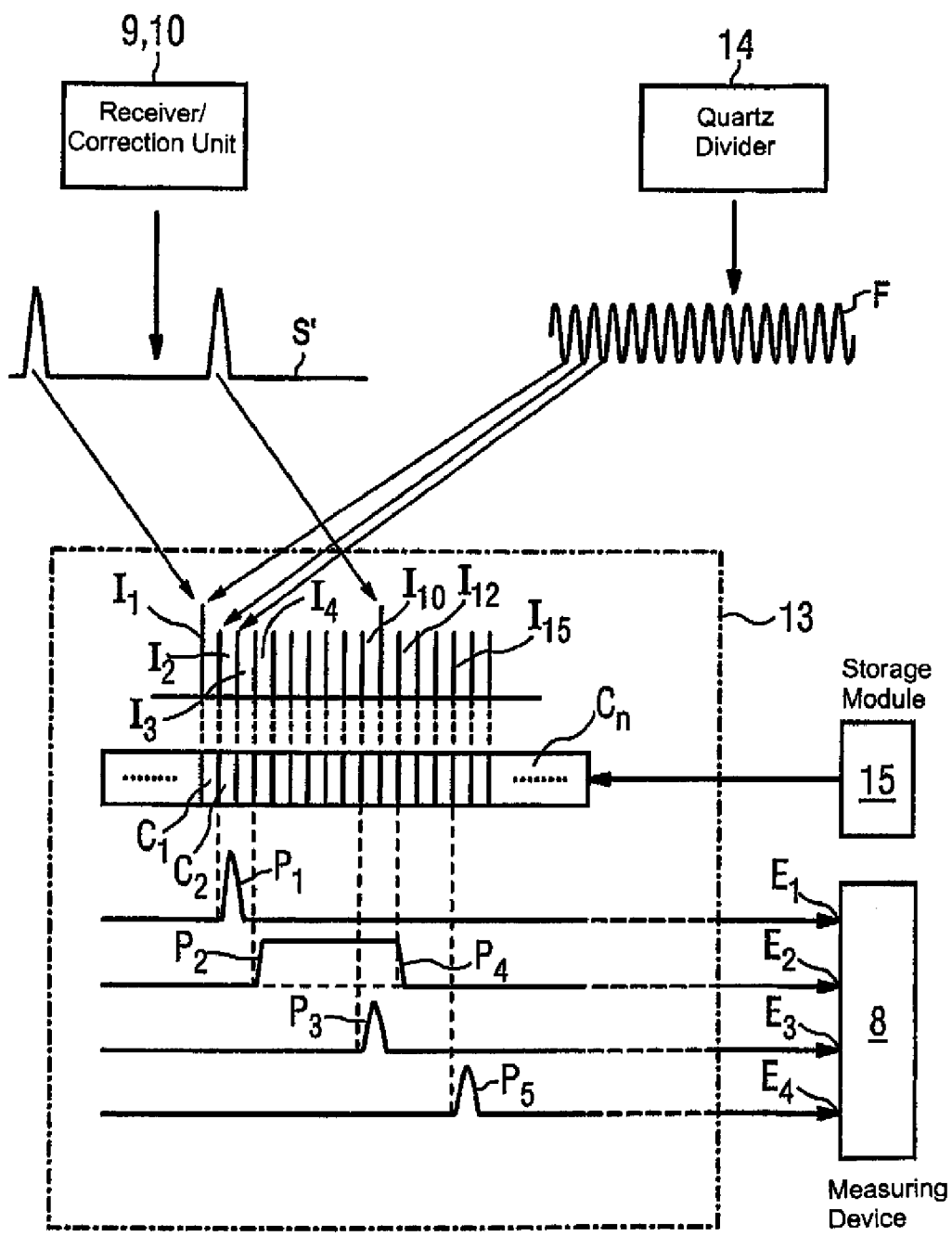

Same or similar elements and dimensions are indicated in the figures by the same reference numeral.

FIG. 1 shows schematically a seismographic measurement system. This system includes a number of measurement stations 1 which are spatially distributed over a measurement area 2. Each measurement station 1 is connected with a central unit 4 via a data transmission path 3 which can be implemented as a data transmission cable or as a wireless transmission path. The measurement data collected by each measurement station 1 are accumulated in the central unit 4 and processed.

Each measurement station 1 receives a timing reference signal Z from a timing reference source 5. The timing reference source 5 can be, for example, a system of several GPS satellites. Because the GPS signal can be received worldwide, the measurement stations 1 can be placed at any location on the earth surface.

FIG. 1 indicates schematically a seismic center 6 from which a shockwave W or a seismic wave propagates in the ground. The seismic center 6 is, for example, the epicenter of an earthquake, the location of an explosion, and the like. The local seismic pattern generated by the shockwave W is recorded by each measurement station 1 and transmitted to the central unit 4. The geographic location of the seismic center 6 can be determined by analyzing the various local seismic patterns, taking into account the propagation time differences of the shockwave W. To prevent errors in determining the location the seismic center 6, the local seismic patterns determined by the various measurement stations 1 must be temporally correlated with each other with the highest possible precision.

The configuration of each measurement station 1 is illustrated in the schematic block diagram of FIG. 2. The measurement station 1 includes a controller 7 and a measuring device 8. The controller 7 assumes the sequence control of the measurement. The measuring device 8 performs the actual measurement, i.e., acquires the measurement data. The measuring device 8 includes, for example, an analog/digital converter or an analog measuring device. In general, regardless of the aforedescribed exemplary embodiment, the measuring device 8 can be any industrial device, in particular a switch, a drive, a valve, etc., which is connected to the controller 7.

The controller 7 includes a receiver 9 adapted to acquire the GPS signal as a timing reference signal Z. The receiver outputs a so-called PPS (pulse-per-second) signal which is supplied as a synchronization signal S to a correction unit 10. The PPS signal includes second pulses with an accuracy of approximately 60 ns. The receiver 9 also sends a telegram T to a computing unit 11. The telegram T is a set of data which includes, inter alia, information about the geographic location of the receiver 9, the absolute local time, and a so-called PFST value. The PFST value include information about the change of a second pulse of the PPS signal due to an orbit change of a GPS satellite or other interferences, such as weather, occlusion by an airplane or line lengths at the receiver 9.

The PFST value is sent as a correction value K to a shift register 12. The shift register 12 determines based on the correction value K a variable delay time V, by which the synchronization signal S is delayed in the correction unit 10. The correction unit outputs a synchronization signal S' which has been corrected by this delay time V and whose second pulses are generated with an accuracy of ±10 psec. This corrected synchronization signal S' is supplied to a pulse divider 13.

The switching frequency F which is generated by a quartz oscillator 14 operating as a timing generator is also supplied to the pulse divider 13. The time deviation of the switching frequency F is set to $\Delta t/t \leqq 10$ psec/sec by selecting a quartz oscillator with adequate precision.

As illustrated in the functional diagram of FIG. 3, the synchronization signal S' is divided in the pulse divider 13 based on the switching frequency F into a number of uniform switching intervals $I_n$ (n =1, 2, 3, . . . ). The switching frequency F for a quartz oscillator is typically in the MHz frequency range, resulting in a number of switching intervals $I_n$ between $10^6$ and $10^8$ per second.

A sequence of switching commands $C_n$ (n=1, 2, 3, . . . ) stored in a storage module 15 is processed synchronously in each of the respective switching intervals $I_n$. This sequence of switching commands $C_n$ can be encoded, for example, in the following manner:

...
" "
—
"Activate measurement Channel 1"
" "
—
"Switch on operating voltage"
" "
—
" "
—
" "
—
" "
—
" "
—
"Read measurement value in register"
" "
—
"Switch off operating voltage"
" "
—
" "
—
"Read measurement value from register"
" "
—
...

This exemplary command sequence is illustrated in the functional diagram of FIG. 3. Each switching command $C_n$ is supplied in the form of a suitable control signal $P_1$ to $P_5$ to the measuring device 8 via a corresponding control input $E_1$ to $E_4$, where it triggers a corresponding switching process of the measuring device 8.

For example, the control signal $P_1$ corresponding to the switching command "Activate measurement Channel 1" is applied to the control input $E_1$ during the switching interval $I_2$, activating to the corresponding measurement channel of the measuring device 8.

In the same way, the operating voltage is switched on by applying the control signal $P_2$ to the control input $E_2$ during the switching interval 14 and again switched off during the switching interval $I_{12}$ by applying the control signal $P_4$. For writing to and reading from a memory register of the measuring device 8, the control signal $P_3$ is applied to the control input $E_3$ during the switching interval $I_{10}$ and the control signal $P_5$ is applied to the control input $E_4$ during the switching interval $I_{15}$, respectively. The switching command "—" indicates a blank instruction which does not cause an immediate reaction of the measuring device 8. The blank instruction is used to bridge switching pauses and to accurately time the other switching processes.

As seen in FIG. 3, a switching interval $I_n$ is assigned to each switching command $C_n$ and also to each switching step of a measurement or control action. The beginning of the switching interval $I_n$ can be determined with the precision of the synchronization pulse S' plus the precision of the switching frequency F in each period of the synchronization signal S'. The instant of each switching process of the measuring device 8 during a measurement or control action can therefore be determined with a timing accuracy of ±20 psec.

Since a controller 7 having the same precision is associated with each measurement station 1 of the measurement system depicted in FIG. 1, and since all measurement stations 1 access the same timing reference signal Z, the individual measurement of the measurement stations 1 are synchronized with a timing precision of ±20 psec.

The sequence of switching commands $C_n$ stored in storage module 15 can be programmed in any desired manner. The controller 7 can therefore be adapted to various measurement and control actions and to controlling a large number of devices.

What is claimed is:

1. A method of executing a measurement or control action, comprising the steps of:
    generating a temporally periodic synchronization signal by a receiver based on a timing reference signal;
    dividing the temporally periodic synchronization signal by a switching frequency generated by a timing generator into a plurality of switching intervals; and
    associating a switching command to each of the switching intervals to trigger an associated switching process of the measurement or control action.

2. The method of claim 1, wherein the receiver comprises a GPS receiver for outputting a pulse-per-second (PPS) signal for use as the temporally periodic synchronization signal.

3. The method of claim 1, wherein the timing generator comprises a quartz oscillator.

4. The method of claim 1, further comprising the step of continuously correcting the synchronization signal by a correction value.

5. A method for synchronizing several measurement and/or control actions, with each of the measurement or control actions being executed by a method of claim 1, wherein the timing reference signal is a common timing reference signal.

6. The method of claim 5, wherein the timing reference signal is a GPS signal.

7. A controller for executing a measurement or control action, comprising:
    a receiver configured to generate a temporally periodic synchronization signal based on a timing reference signal;
    a timing generator configured to generate a switching frequency;
    a pulse divider configured to divide the temnorally periodic synchronization signal into a plurality of switching intervals based on the switching frequency and associating a switching command to each of the switching intervals; and
    a device receiving the switching command from the pulse divider for triggering a corresponding switching process and executing the measurement or control action.

8. The controller of claim 7, further comprising a stored program control for supplying a sequence of switching commands to the pulse divider.

* * * * *